G. W. COMBS.
GYRATORY STRUCTURE.
APPLICATION FILED JULY 21, 1908. RENEWED DEC. 13, 1915.
1,183,957.
Patented May 23, 1916.
2 SHEETS—SHEET 1.
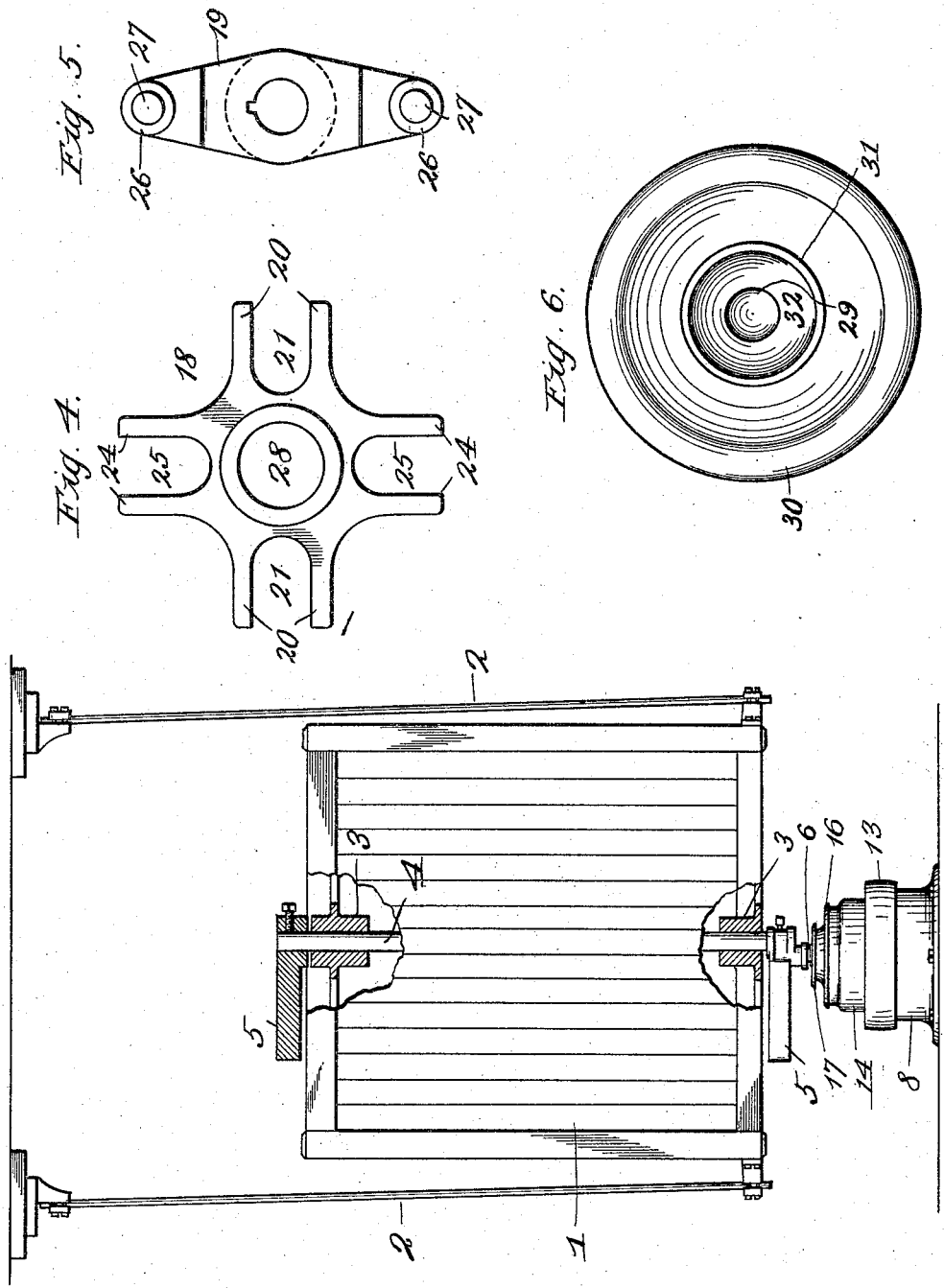
WITNESSES:
R. C. Hamilton.
M. Cox.
INVENTOR.
George W. Combs,
BY
F. G. Fischer
ATTORNEY.

G. W. COMBS.
GYRATORY STRUCTURE.
APPLICATION FILED JULY 21, 1908. RENEWED DEC. 13, 1915.
1,183,957.
Patented May 23, 1916.
2 SHEETS—SHEET 2.
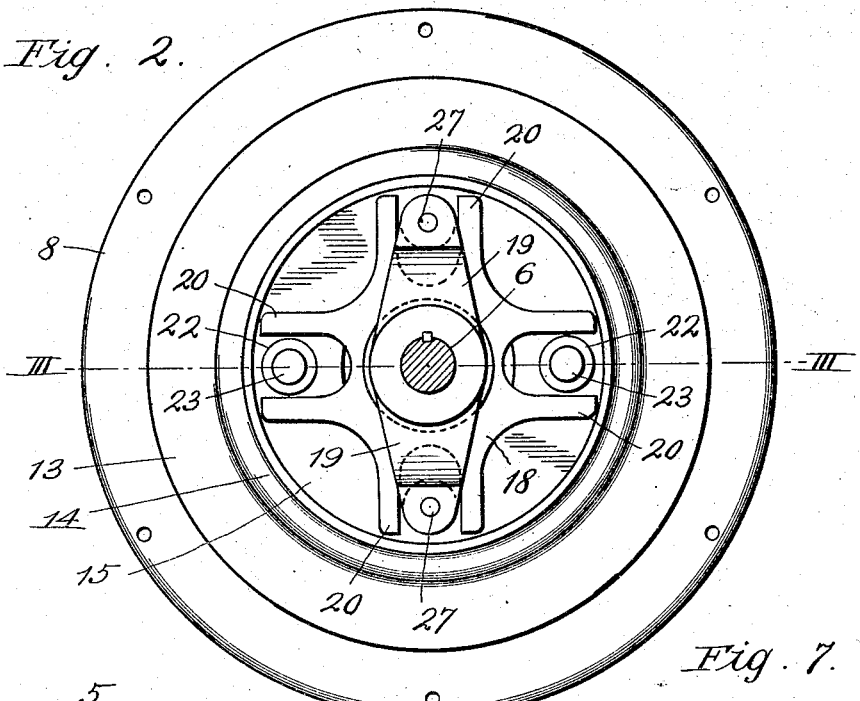
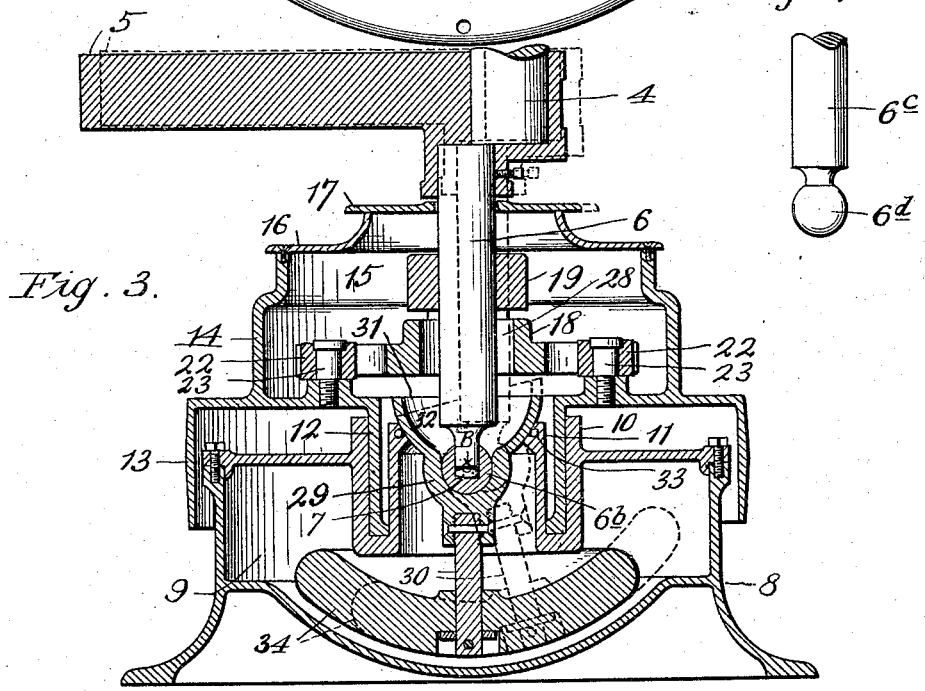

UNITED STATES PATENT OFFICE.

GEORGE W. COMBS, OF LEAVENWORTH, KANSAS.

GYRATORY STRUCTURE.

1,183,957. Specification of Letters Patent. Patented May 23, 1916.

Application filed July 21, 1908, Serial No. 444,677. Renewed December 13, 1915. Serial No. 66,664.

*To all whom it may concern:*

Be it known that I, GEORGE W. COMBS, a citizen of the United States, residing at Leavenworth, in the county of Leavenworth and State of Kansas, have invented certain new and useful Improvements in Gyratory Structures, of which the following is a specification.

My invention relates to improvements in gyratory structures, such as flour sifters, etc.; and my object is to overcome excessive throw of the gyratory structure which is not only detrimental to the structure itself, but also to the building containing the same on account of the vibration imparted by said structure to the building. This excessive throw in gyratory structures generally occurs when starting or stopping the sifter, or before it attains the critical speed of rotation. It also occurs when the structure becomes unbalanced by being underloaded or overloaded with stock, and when the structure has a rigid connection with the building, as through its drive-shaft and a stationary bearing, considerable strain is imposed upon the building whenever the structure leaves its true gyratory course.

I overcome excessive throw of the structure by providing novel restraining means mounted independently of said structure, embracing a weight and lever, and I relieve the structure and the building of abnormal strain by yieldingly-connecting the shaft of said structure to the building.

Referring now to the accompanying drawings, which illustrate the invention, Figure 1 represents an elevation of the structure provided with my improvements. Fig. 2 is a plan view of a pedestal and a yielding-coupling employed in carrying out the invention. Fig. 3 is a vertical section on line III—III of Fig. 2. Figs. 4 and 5 are details of the yielding-coupling whereby power is transmitted from the driver to the structure. Fig. 6 is a detail plan view of the restraining means. Fig. 7 is a modified form of an eccentric-pin employed in carrying out the invention.

1 designates the gyratory structure, which in the present instance, is in the form of a sieve-box freely supported from the ceiling of the building by rods 2, so that it may gyrate. Said structure is provided with centrally-disposed bearings 3, in which a vertically-positioned drive-shaft 4 is journaled, said shaft being provided with eccentric weights 5 whereby a gyratory motion is imparted to the structure when the shaft is rotated.

6 designates a pin fixed eccentrically to the lower end of the shaft, but having its axis in alinement with the axis of rotation so that the shaft will rotate around said pin and thus perform the function of a crank-shaft. Weights 5 are set a short distance from bearings 3 so that the shaft and the pin may move vertically to a limited extent with the means, hereinafter described. The lower end of pin 6 is preferably reduced in diameter and rests upon a block 7, arranged in the recess of a ball 6$^b$, or the ball may be integral with said pin as shown in the modified form, Fig. 7, wherein 6$^c$ designates the pin and 6$^d$ the ball.

8 designates a pedestal fixed to an adjacent portion of the building and provided with a fluid-chamber 9, a centrally-disposed step-bearing 10, and a concaved annular seat 11, which latter is arranged inside the bearing 10 and spaced a slight distance therefrom so that the hollow hub 12 of a driver 13 may be journaled in bearing 10, as shown in Fig. 3. Driver 13, which is stationary so far as lateral movement is concerned, has an upwardly-extending wall 14 forming a lubricant-chamber 15, of which the hollow hub 12 forms a part. Chamber 15 is closed at its upper end by a lid consisting of a stationary section 16, and a loosely mounted section 17, which latter is movable on the former so that it may gyrate with the eccentric-pin 6.

Driver 13 transmits motion to the structure through the intermediacy of a yielding-coupling located in chamber 15, consisting of a lower member 18, and an upper member 19. Member 18 is provided with a pair of diametrically-opposed arms 20 having open slots 21 to loosely receive a pair of diametrically-arranged antifriction rollers 22 journaled on a pair of pins 23 projecting from driver 13. Member 18 is also provided with a pair of arms 24 arranged at right angles to arms 20 and provided with open slots 25 to loosely receive a pair of antifriction rollers 26 mounted on pins 27, depending from the ends of member 19, which latter is keyed to pin 6, while member 18 has a large central opening 28, so that it may move freely without contacting with pin 6. With the coupling constructed and arranged as above described, it will be understood that when the driver rotates it will rotate the structure through pin 6, the latter, however, is permitted to gyrate through the intermediacy of the yielding-coupling, while the driver is mounted in a fixed bearing and hence has no lateral or gyratory motion. The operation of the coupling will be attended with but little friction as the weight of the drive-shaft and its weights are supported by the restraining means hereinafter described.

The restraining means, referred to, whereby the structure is restricted from abnormal gyratory motion, consists of independently-supported weight-controlled means having a universal connection with pin 6. Said means consists of a lever comprising a socket 29, in which ball 6$^b$ rests, and a rod 30 which latter may be secured to the socket as shown in Fig. 3, or it may be formed integral with said socket. The upper portion 31 of said socket is substantially semi-spherical in form to provide a lubricant-chamber 32 and to fit in seat 11, in which it is free to move in all directions, ball-bearings 33 being interposed between the seat and the socket to reduce the wear to a minimum. Socket 29 and rod 30 are normally held in a vertical position by a pendant weight 34, which is preferably circular in plan view and concaved in cross section so that it will be free to swing with the socket and the rod without contacting with the lower end of bearing 10.

Should the structure become unbalanced from any cause while in operation and leave its true gyratory path, it will carry the eccentric-pin therewith, and through it, cause the socket 29 and weight 34 to gyrate and assume the dotted position shown in Fig. 3. The weight, however, in attempting to resume its normal position will exert considerable force on the restraining lever, which being fulcrumed in seat 11 and pushing against the pin in a plane with point B, multiplies the restraining force of the weight in proportion to the difference in the distance between the fulcrum point and point B, and between point B and the weight 34. The resistance offered by the lubricant in chamber 9, to the upward movement of weight 34, materially assists said weight in restraining the structure from abnormal throw.

Having thus described my invention, what I claim is:—

1. In combination a gyratory structure, a stationary support, weight-controlled restraining means between the structure and said stationary support whereby abnormal throw of the structure is restricted, a chamber in which said controlling means is free to swing, and fluid in said chamber to offer resistance to said controlling means.

2. In combination, a gyratory structure, means for preventing rotation of said structure, a stationary support, weight-controlled restraining means between the structure and the stationary support whereby abnormal throw of said structure is restricted, a chamber in which said controlling means is free to swing, and fluid in said chamber to offer resistance to said controlling means.

3. In combination, a gyratory structure, supporting means for said structure preventing rotation, a stationary support, weight-controlled restraining means between the structure and said stationary support whereby abnormal throw of said structure is restricted, a chamber in which said controlling means is free to swing, and fluid in said chamber to offer resistance to said controlling means.

4. In combination, a gyratory structure, a driver therefor, a stationary bearing for said driver, a weight-controlled lever mounted independently of the structure whereby excessive throw of the latter is restricted, and a pedestal inclosing said lever and provided with a seat therefor.

5. In combination, a gyratory structure, a driver therefor, a lever mounted independently of said structure and the driver, means yieldingly connecting said lever and the structure, a weight fixed to said lever for restricting excessive throw of the structure, and a pedestal embodying a seat for said lever and a bearing for the driver.

6. In combination, a suspended body, a shaft arranged therein and weighted to produce a gyratory movement, a fixedly-mounted driver therefor, a suspended support for said shaft which is weighted to restrain abnormal throw of the suspended body, and a ball-and-socket connection between the shaft and said suspended support.

7. In combination, a suspended body, an eccentrically-weighted shaft therefor, a driver for the shaft, and a suspended lever for supporting said shaft which is weighted to restrain abnormal throw of the suspended body, said lever being normally in axial alinement with the shaft.

8. In combination, a gyratory structure, a driver therefor, a stationary bearing for said driver, and weight-controlled restraining means also supported by said bearing, for the purpose described.

9. In combination, a gyratory structure, a shaft therefor, weights connected to said shaft whereby it is given a tendency when in motion to travel in a gyratory path, a driver for said shaft, a bearing for said driver, and weight-controlled restraining means for supporting the shaft.

10. In combination, a suspended body, a shaft therefor, eccentrically-mounted weights on said shaft whereby it is given a tendency when in motion to travel in a gyratory path, a driver for the shaft, a bearing for said driver, and weight-controlled restraining means for supporting the weight of the shaft and its weights.

11. In combination, a gyratory sieve-box, a shaft mounted therein, a driver surrounding the axis of movement, a support for the shaft independent of the sieve-box and the driver consisting of weight-controlled restraining means having a universal connection with the shaft, and a suitable support for said restraining means.

12. In combination, a gyratory structure, a shaft therefor, a driver provided with a lubricant-chamber, weight-controlled restraining means in said chamber loosely connected to the shaft to restrain abnormal throw of the structure, and a yielding-coupling also in said chamber for connecting the shaft and the driver.

13. In combination, a gyratory structure, a driver therefor, a fixed bearing for said driver, yielding connections between the structure and said driver, and weight-controlled means suspended independently of the structure whereby the latter is restrained from abnormal throw.

14. In combination, a gyratory structure, a shaft therefor, a driver provided with a lubricant-chamber, a fixed bearing for said driver, weight-controlled restraining means extending into said chamber for restricting excessive throw of the structure, movable means in the chamber connecting the driver and the shaft, and a lid for closing the top of the chamber 15. In combination, a suspended body, a shaft for imparting a gyratory motion thereto, said shaft being free to move vertically to a limited extent, and weight-controlled means for restricting abnormal throw of the suspended body, said means being loosely suspended and yieldingly-connected to the shaft to move the same vertically and gyrate therewith.

16. In combination, a gyratory structure, a shaft for driving the same, an independently freely mounted socket supporting said shaft, and a weight pendant from the socket for restricting the throw of the structure.

17. In combination, a gyratory structure, a vertically-positioned shaft for driving the same, an independently freely mounted lever embracing a socket for supporting the shaft, and a weight pendant from said lever for restricting the throw of the structure.

18. In combination, a gyratory structure, a shaft for driving the same, a driver for said shaft, an independently freely mounted socket supporting said shaft, a rod fixed to said socket and depending therefrom, and a weight carried by said rod for restricting the throw of the structure.

19. In combination, a gyratory structure, a shaft for driving the same, a pedestal embodying a lubricant-chamber and an annular seat, a lever freely mounted in said seat embodying a socket for supporting the shaft, and a weight pendant from the lever and arranged in the lubricant-chamber for restricting the throw of the structure.

20. In combination, a gyratory structure, a shaft for driving the same, a pedestal embodying a lubricant-chamber, and an annular seat, a socket freely mounted in said seat and supporting the shaft, and a weight pendant from the socket and arranged in the lubricant-chamber for restricting the throw of the structure.

21. In combination, a gyratory structure, a shaft for driving the same, a step-bearing embracing an annular concaved seat, a segmental-spherical socket freely mounted in said seat and supporting the shaft, said socket having a lubricant-chamber surrounding the adjacent terminal of the shaft, and a weight pendant from said socket for restricting the throw of the structure.

22. In combination, a gyratory structure, a shaft for driving the same, an independently freely mounted socket supporting said shaft, a weight pendant from the socket for restricting the throw of the structure, and a driver for the shaft provided with a hollow hub through which the socket extends.

23. In combination, a sieve-structure, a shaft for driving the same, an independently freely mounted lever embodying the socket for supporting said shaft, a weight pendant from said lever for restricting the throw of the structure, and a driver for the shaft provided with a hollow hub through which the lever extends.

24. In combination, a gyratory structure, a shaft therefor, a driver for said shaft embracing a lubricant-chamber, a step-bearing provided with a lubricant-chamber communicating with the chamber in the driver, a socket freely mounted in the step-bearing to support the shaft, said socket having a lubricant-chamber surrounding the adjacent end of the shaft and communicating with the chamber in the driver, and a weight fixed to said socket in axial alinement therewith for restricting the throw of the structure.

25. In combination, a gyratory structure, a shaft for driving the same, an independently freely mounted socket, a ball loosely mounted in said socket for supporting the shaft, a weight fixed to the socket for restricting the throw of the structure, and a driver for said shaft.

26. In combination, a gyratory structure, a shaft for driving the same, an independently freely mounted socket, a ball loosely mounted in said socket having a recess, a block in said recess and upon which the lower terminal of the shaft rests, a weight pendant from the socket for restricting the throw of the structure, and means for driving the shaft.

In testimony whereof I affix my signature, in the presence of two witnesses.

GEORGE W. COMBS.

Witnesses:
G. D. OBERSCHELP,
C. S. MOAK.

Copies of this patent may be obtained for five cents each, by addressing the "Commissioner of Patents, Washington, D. C."